(12) United States Patent
Adamczewski et al.

(10) Patent No.: US 7,090,105 B2
(45) Date of Patent: Aug. 15, 2006

(54) VEHICLE EXTERIOR MATERIAL CLAMPING APPARATUS WITH SCISSORS-LIKE CLOSURE MOTION

(76) Inventors: Zbigniew Jozef Adamczewski, 1115 St. Louis Ave. #1, Long Beach, CA (US) 90804; Ruth Esther Gosey, 1115 St. Louis Ave., #1, Long Beach, CA (US) 90804

( * ) Notice: Subject to any disclaimer, the term of this patent is extended or adjusted under 35 U.S.C. 154(b) by 241 days.

(21) Appl. No.: 10/650,907

(22) Filed: Aug. 27, 2003

(65) Prior Publication Data

US 2005/0045683 A1    Mar. 3, 2005

(51) Int. Cl.
*B60R 9/00* (2006.01)

(52) U.S. Cl. .................. 224/543; 224/42.33; 224/405; 296/3; 211/41.15

(58) Field of Classification Search .............. 224/543, 224/282, 497, 498, 502, 553, 549, 570, 403, 224/405, 523, 525, 526, 530, 531, 535, 536, 224/552, 495; 211/41.14, 96, 168, 41.15, 211/199, 169.1, 201
See application file for complete search history.

(56) References Cited

U.S. PATENT DOCUMENTS

| 1,991,900 | A | * | 2/1935 | Larsen | 224/546 |
|---|---|---|---|---|---|
| 2,080,527 | A | * | 5/1937 | Bixel | 248/316.5 |
| 2,980,379 | A | * | 4/1961 | Goldfus | 248/206.4 |
| 3,443,730 | A | * | 5/1969 | Meusel | 224/536 |
| 4,278,175 | A | * | 7/1981 | Jackson | 224/561 |
| 4,817,834 | A | * | 4/1989 | Weiler | 224/509 |
| 4,927,032 | A | * | 5/1990 | Mercure | 211/41.14 |
| 4,944,434 | A | * | 7/1990 | Hamilton | 224/549 |
| 4,989,768 | A | * | 2/1991 | McNulty | 224/405 |
| 5,255,951 | A | * | 10/1993 | Moore, III | 296/3 |
| 5,450,956 | A | | 9/1995 | Peckenpaugh, Sr. et al. | 206/315.11 |
| 5,456,564 | A | * | 10/1995 | Bianchini | 414/462 |
| 5,713,620 | A | * | 2/1998 | Port | 296/3 |
| 6,032,842 | A | * | 3/2000 | Brickner | 224/560 |
| 6,126,053 | A | * | 10/2000 | Shaver | 224/509 |
| 6,193,123 | B1 | | 2/2001 | Adamczewski et al. | 224/405 |
| 6,450,379 | B1 | * | 9/2002 | Cook | 224/405 |
| 6,845,894 | B1 | * | 1/2005 | Vyvoda | 224/405 |

* cited by examiner

*Primary Examiner*—Nathan J. Newhouse
*Assistant Examiner*—Justin M. Larson
(74) *Attorney, Agent, or Firm*—Gene Scott, Patent Law & Venture Group

(57) ABSTRACT

An apparatus for carrying a workpiece adjacent an exterior surface of a vehicle, provides a stationary resting surface mounted on an exterior surface of the vehicle and one or more movable clamping bars positioned adjacent to the resting surface. A driving screw moves the clamping bar in a scissors type motion, alternately toward the resting surface, so as to clamp the workpiece, and away from the resting surface so as to release the workpiece, whereby the workpiece may be safely transported by the vehicle. The apparatus may be mounted onto a panel truck, normally adjacent to one or both side panels, or may be mounted on the sides of a pick-up type truck.

6 Claims, 5 Drawing Sheets

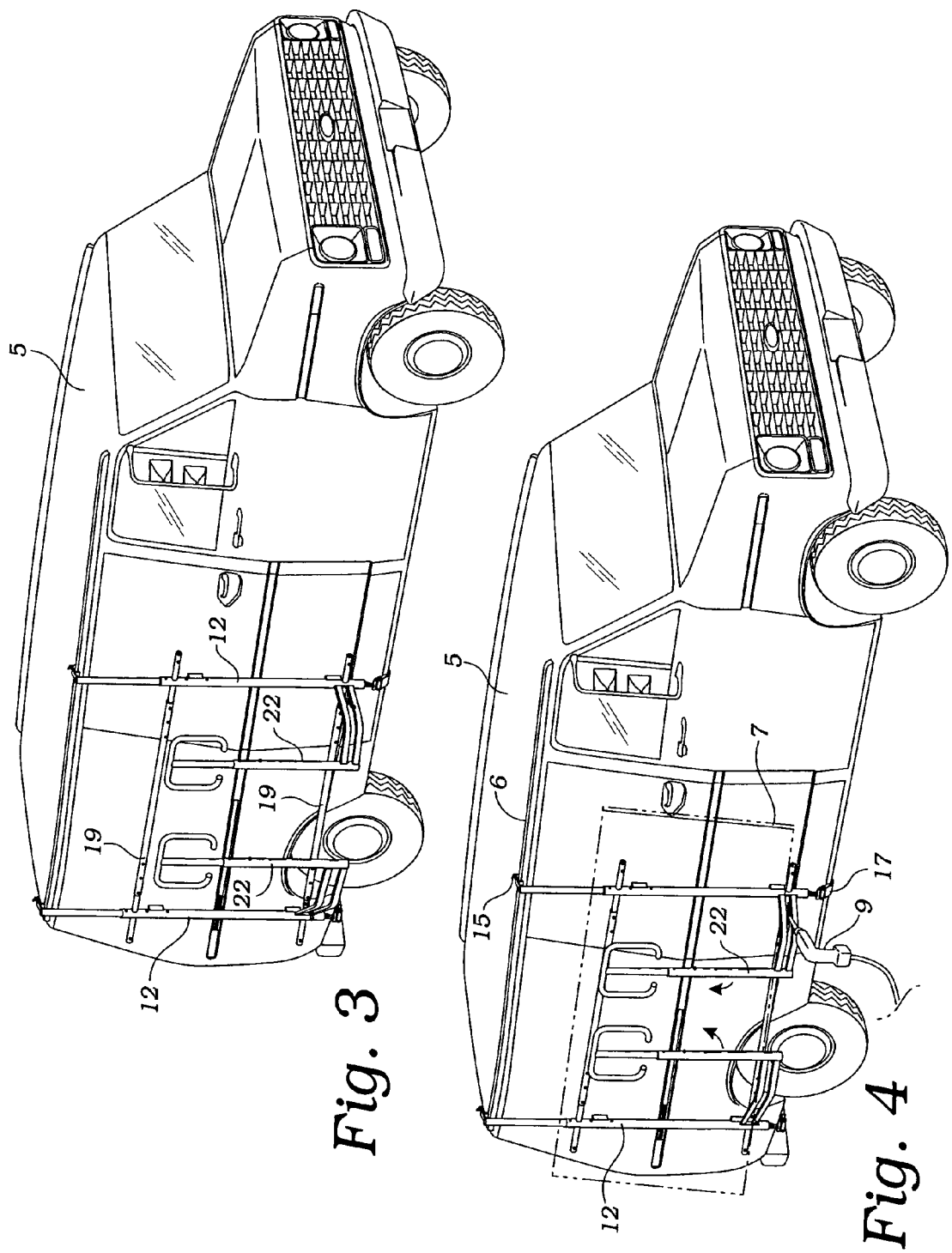

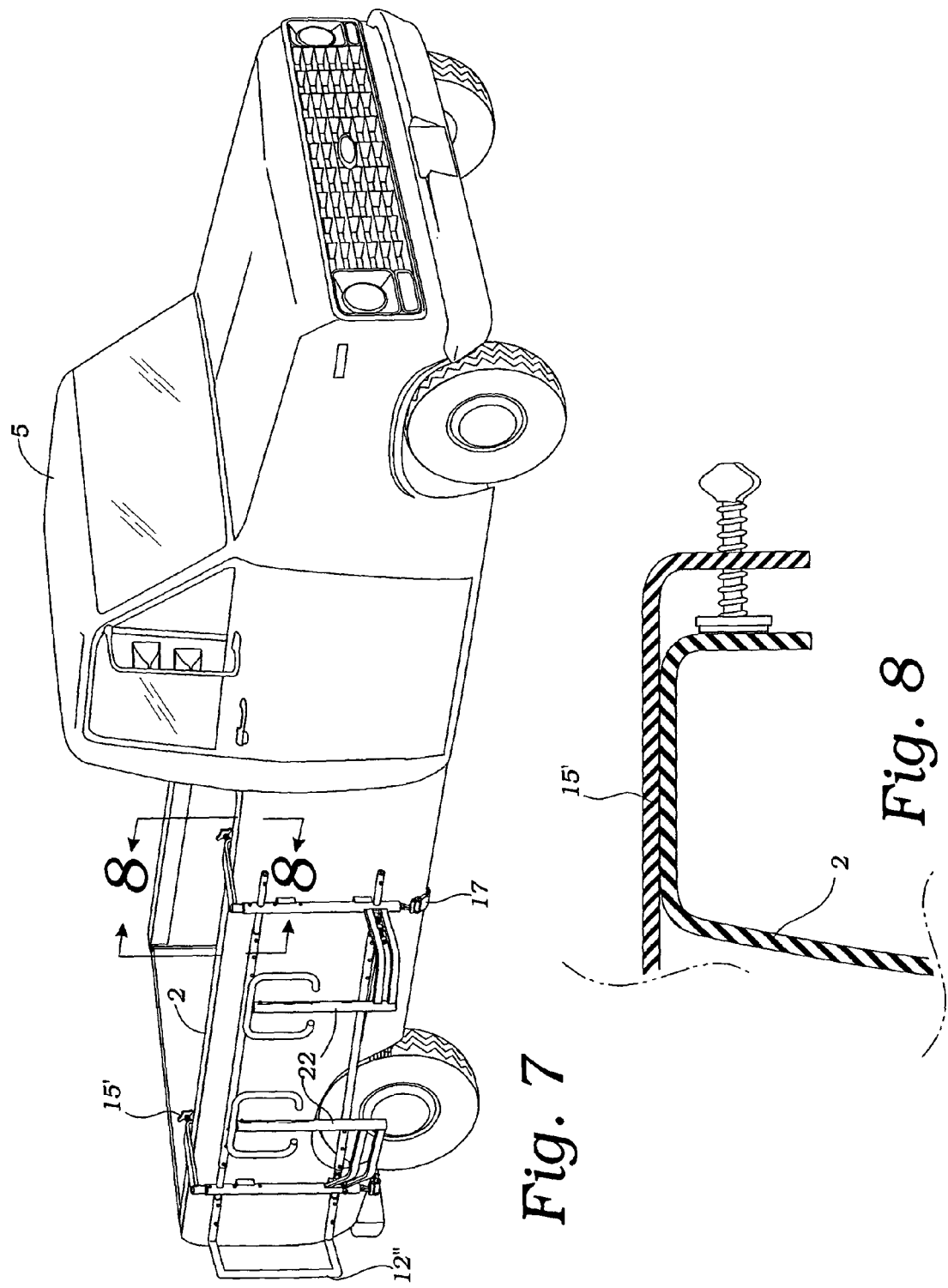

VEHICLE EXTERIOR MATERIAL CLAMPING APPARATUS WITH SCISSORS-LIKE CLOSURE MOTION

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTTED ON A COMPACT DISC

Not applicable.

REFERENCE TO A "MICROFICHE APPENDIX"

Not applicable.

BACKGROUND OF THE INVENTION

1. Field of the Present Disclosure

This invention relates generally to materials transporting devices, and more particularly to such a device for clamping panels onto the exterior of a truck for transporting such goods.

2. Description of Related Art including information disclosed under 37 CFR 1.97 and 1.98

The following art defines the present state of this field:

Adamczewski et al, U.S. Pat. No. 6,193,123, teaches a precursor apparatus of a similar type to the present invention and intended for the same purpose. However, the '123 reference is not easily adapted for temporary mounting onto the exterior of a truck nor for easy adjustability for different sized trucks and workloads. The '123 reference teaches that the clamping drive be mounted under the truck with the screw piercing the truck body. This is undesirable in most cases to those that would haul materials on a non-commercial basis. The clamping action is direct with the movable jaw moving away and toward the stationary jaw. In the present invention a much more effective scissors-type motion is provided. The distinctions between '123 and the present invention will become clear from the following detailed description and accompanying drawings.

Peckenpaugh, Sr., et al., U.S. Pat No. 5,450,956 describes an adjustable, telescopic, carrying and storage case of variable and fixed length including a hollow adjustable, telescopic front member of variable length and a hollow adjustable, telescopic rear member of variable length that can be separated or connected tightly. The case is adjustable in length and can be used at a maximum length and at a minimum length for ease in transportation. The case is preferably used for carrying and storing different items including telescopic fishing rod assemblies. The telescopic front member comprises a first container portion and a plurality of adjustable front telescopic locking sections which are placed in an interlocking relationship through a plurality of annular tapered locking surfaces and a number of annular locking surfaces. The telescopic rear member comprises a second container portion and a plurality of adjustable rear telescopic locking sections which are placed in an interlocking relationship through a plurality of annular tapered locking surfaces and a number of annular locking surfaces.

Emer, EP0314632, describes an apparatus for the handling of sheets made of glass or other materials, as panels and the like, shaped as plates and to be used for supply said sheets or plates in working lines and to be mounted on an overhead traveling crane running along the working line. The apparatus comprises a frame provided with pneumatic devices for griping a sheet or plate at least two chains for the support of the frame and cooperating with means apt to case the suspended sheet or plate to be rotated, said chains being supported, through a support telescopic device of an adjustable length, by a truck traveling along the rail beams of the overhead traveling crane.

Lautenschlager, EP0580075, describes an automatic telescopic device for drawer runners, comprising a guide rail formed by a profile section turned over from sheet metal to be secured to the carcass wall, said guide rail having a profiled flange bent upwardly from a profiled flange projecting substantially at right angles and horizontally from the carcass wall and engaging from below the associated runner formed by a hollow profile section open at its underside to be removably secured to the drawer, and provided in the interior of the runner with raceways for rolling elements which are held in an elongated cage and can roll, on the one hand, on the raceways of the guide rail and, on the other hand, on raceways formed by associated regions of the inner surface of the runner, thereby allowing for longitudinal displacement of the runner relative to the guide rail, a component which can pivot between two end positions and is biased bistably into the end positions by means of spring arrangement being provided and having an open-ended recess for a projection projecting downwardly from the runner in a portion projecting beyond the horizontal profiled flange of the guide rail into the interior of the carcass, and the projection and the pivoting component being arranged relative to one another in relation to the runner or the guide rail in such a manner that, when the runner is displaced from the open-drawer position, as it approaches the closed position, the projection moves into the recess in the pivoting component in the end position associated with the open-drawer position and then, once the dead center of the pivoting component has been passed, is driven resiliently together with the latter into the closed-drawer position, characterised in that the pivoting component is mounted in a separate elongated housing secured to the guide rail so as to pivot about a substantially perpendicular axis and that a detent is provided immediately in front of the recess in the pivoting component as viewed in the direction of insertion of the drawer, wherein said detent is withdrawn into the housing into the path of the projection projecting from the runner in the end position associated with the open-drawer position, and in the end position associated with the closed-drawer position projects into the path of the projection, but can be traversed by the projection in the direction of insertion by means of resilient deformation.

Lechevallier, EP0691911 describes a removable frame for loading, unloading and moving container's of goods on trucks or wagons without typical lifting machinery such as cranes, gantries and such. It permits unload directly onto the ground. The invention is characterized by arrangement of a frame encompassing the load. Two lifting surfaces are provided with lateral spacing between them and are placed transverse of the vehicle's axle. Each of the surfaces is lifted by a telescoping jack and facility for locking the load in place is provided.

The prior art teaches a very wide range of materials storage and handling systems. However, the prior art does not teach that an actuated clamping device may be mounted onto a truck for clamping panel goods for transport. The present invention fulfills these needs and provides further related advantages as described in the following summary.

BRIEF SUMMARY OF THE INVENTION

The present invention teaches certain benefits in construction and use which give rise to the objectives described below.

The present invention provides an apparatus for carrying a workpiece adjacent an exterior surface of a vehicle, including a stationary resting surface mounted on the exterior surface and one or more movable clamping bars positioned adjacent to the resting surface. A driving screw moves the clamping bar in a scissors type motion, alternately toward the resting surface, so as to clamp the workpiece, and away from the resting surface so as to release the workpiece, whereby the workpiece may be safely transported by the vehicle. The apparatus may be mounted onto a panel truck, normally adjacent to one of its side panels, or may be mounted on a side of a pick-up type truck.

A primary objective of the present invention is to provide a workpiece carrying device and method of use having advantages not taught by the prior art.

Another objective is to provide such a device that is temporarily mounted on a truck body and holds the workpiece for transport.

A further objective is to provide such a workpiece carrying device that is able to open to accept a load and to close to clamp the load on a truck where the motion is of the scissor type.

Other features and advantages of the present invention will become apparent from the following more detailed description, taken in conjunction with the accompanying drawings, which illustrate, by way of example, the principles of the invention.

BRIEF DESCRIPTION OF TITLE SEVERAL VIEWS OF THE DRAWING(S)

The accompanying drawings illustrate the present invention. In such drawings:

FIG. 3 is a perspective view of the clamp as mounted onto a panel truck in a clamp-open attitude;

FIG. 4 is similar to FIG. 3 showing the clamp in a clamp-closed attitude with a workpiece clamped in place;

FIG. 7 is an alternate application wherein the apparatus is mounted onto a pick-up type truck; and FIG. 8 is an enlarged partial sectional view of FIG. 7 taken along line 8—8 and showing the method of clamping to a side wall of a pick-up type truck.

DETAILED DESCRIPTION OF THE INVENTION

The above described drawing figures illustrate the present invention, an apparatus for carrying panel materials such as gypsum wallboard, plywood sheets, glass sheets and other materials, which will be summarily referred to herein as the "workpiece 7", where the workpiece 7 is held in a vertical attitude adjacent to a side or rear panel of a vehicle 5 such as a panel truck, shown in FIGS. 3–6 or a pick-up type truck, shown in FIG. 7. Preferably, the apparatus mounts onto a truck side panel 3 and secures one or more sheets or panels which constitute the workpiece 7 so that they may be safely transported.

Figure 1:
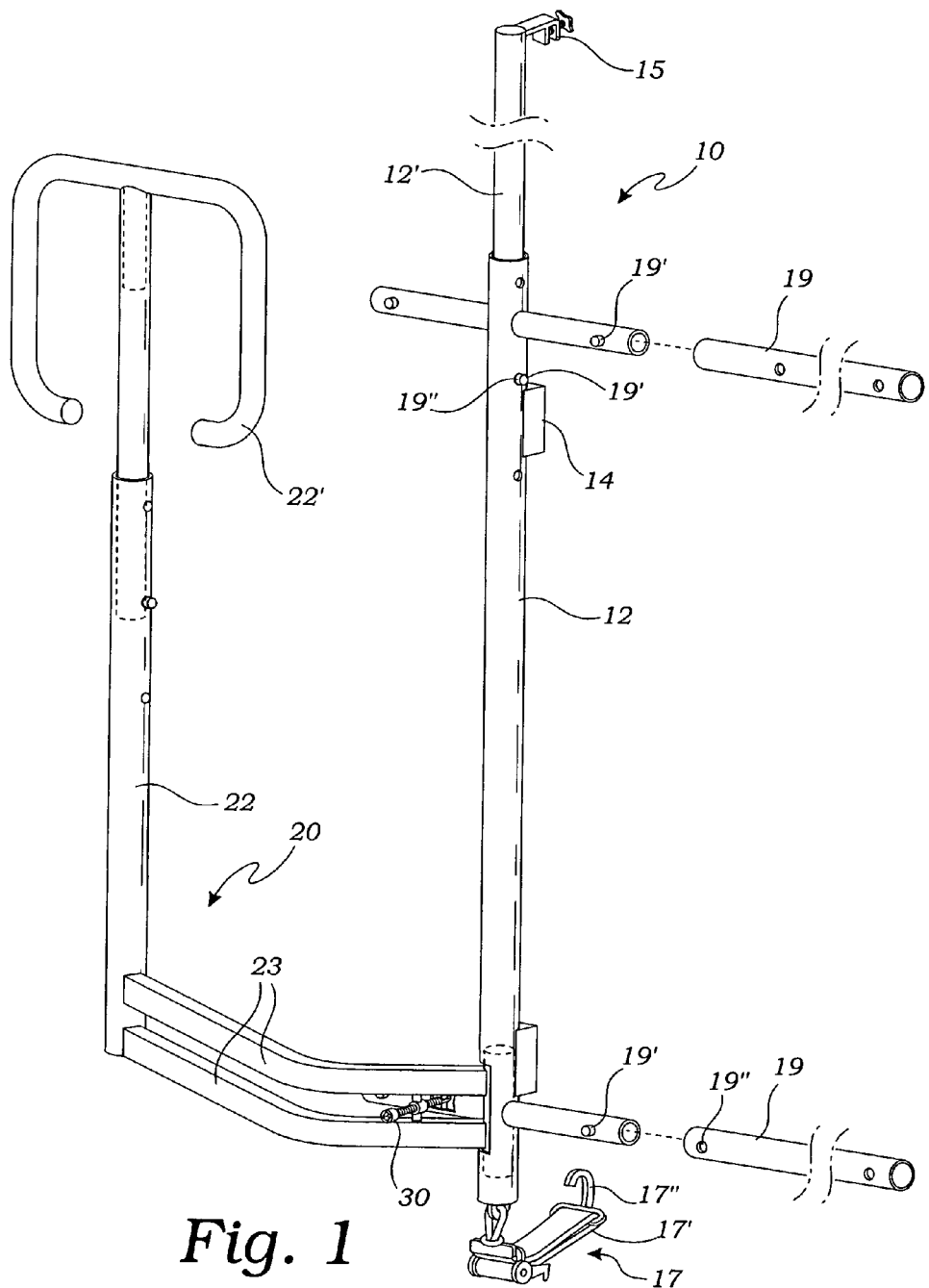
FIG. 1 is a perspective view of a workpiece clamp of the preferred embodiment of the invention showing a mounting means and a screw for providing scissor type motion.

The present invention includes a stationary means for resting 10, the resting means mounted on the exterior surface 3 (or panel) of the vehicle 5 wherein the workpiece 7 is rested against the resting means 10. The resting means 10 preferably includes one or more vertical rest bars 12 held in contact with the truck's panel, preferably in a temporary manner by rubber contactors 14, and is able to be easily removed or attached as desired. The vertical rest bars 12 preferably include a telescoping upper member 12' for adjustment of the vertical reach of the rest bars 12 to accommodate different size trucks. Telescoping bar members are well known in the art. Attachment to the vehicle 5 is accomplished by providing upper 15 and lower 17 clamps (FIG. 1). The upper clamp 15 preferably engages an upper water diverter tab 6 that extends along the top of most panel trucks (FIGS. 3–5), or clamps onto the side wall 2 of a pick-up type truck as shown in FIGS. 7 and 8 with a different clamp 15' adapted for a side wall 2. The lower clamp 17 is preferably a strap 17' with hook 17" as best seen in FIG. 1. The hook 17" is caught under the vehicle 5 and the strap 17' provides an adjustable reach. By tightening such strap 17' the vertical rest bars 12 are safely and securely engaged with the truck 5. Such clamps, straps and hooks are well known in the art. The resting means 10, further preferably includes horizontal rest bars 19 interconnecting vertical rest bars 12, and these horizontal rest bars 19, may be selected with a length for appropriate spacing of the vertical bars 12, or the horizontal rest bars 19 may be telescopically adjustable for selecting such spacing. Preferably spring loaded caps 19' are provided which enable engagement of horizontal bars 19 quickly and simply so that assembly and disassembly and changing of the spacing between vertical bars 12 is enabled. Such spring loaded caps 19' are well know for engaging holes 19" in interconnecting members.

A movable means for clamping 20 is positioned adjacent to, and is pivotally engaged with, the resting means 10 as shown in FIG. 1. A means for driving 30 the clamping means 20, in a scissors type motion, alternately toward the resting means 10 so as to clamp the workpiece 7 therebetween, and away from the resting means 10 so as to release the workpiece 7, is enabled, whereby the workpiece 7 provides safe transport of the workpiece 7 by the vehicle 5.

Figure 2:
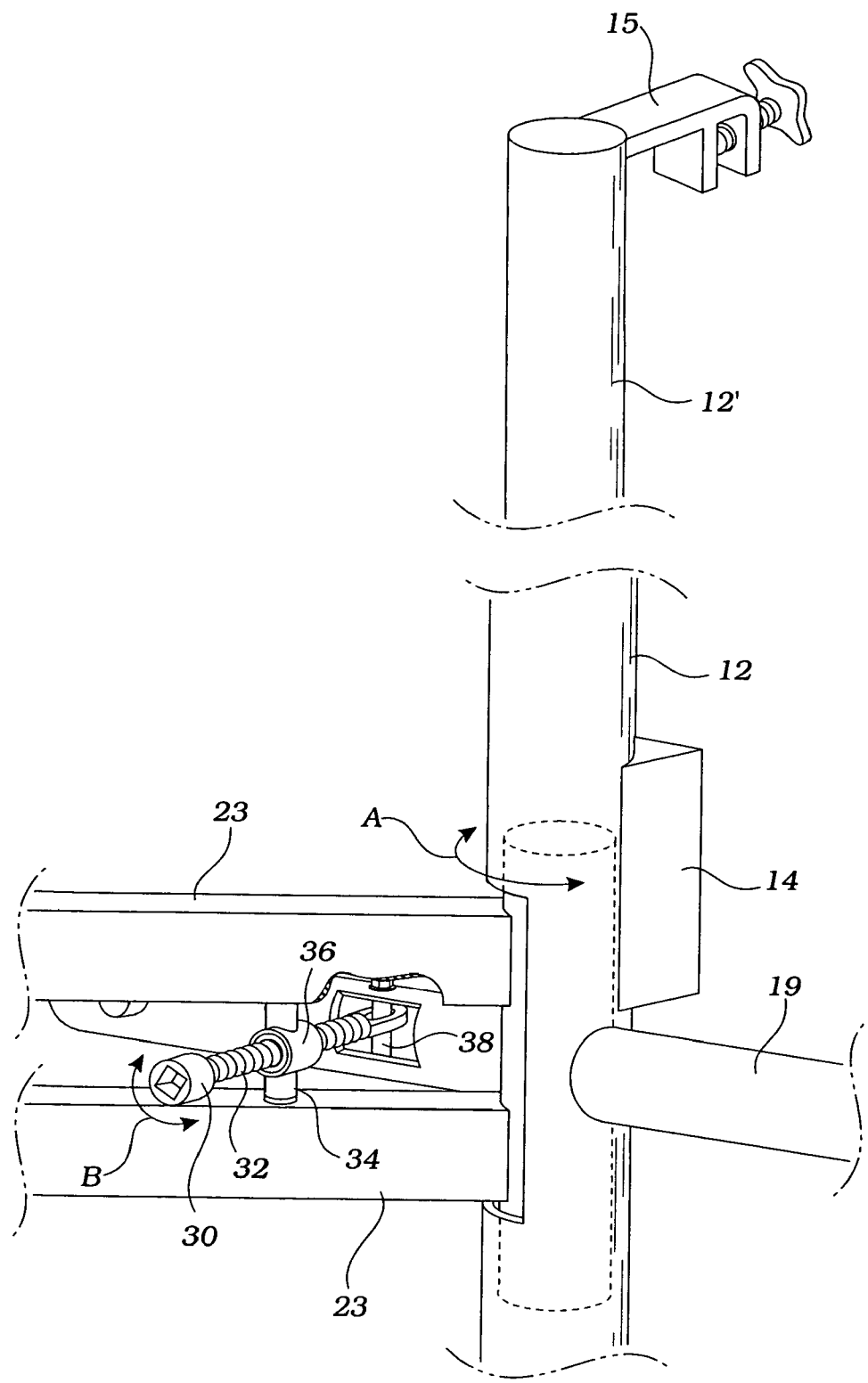
FIG. 2 is a close-up view of the screw thereof.
Figure 5:
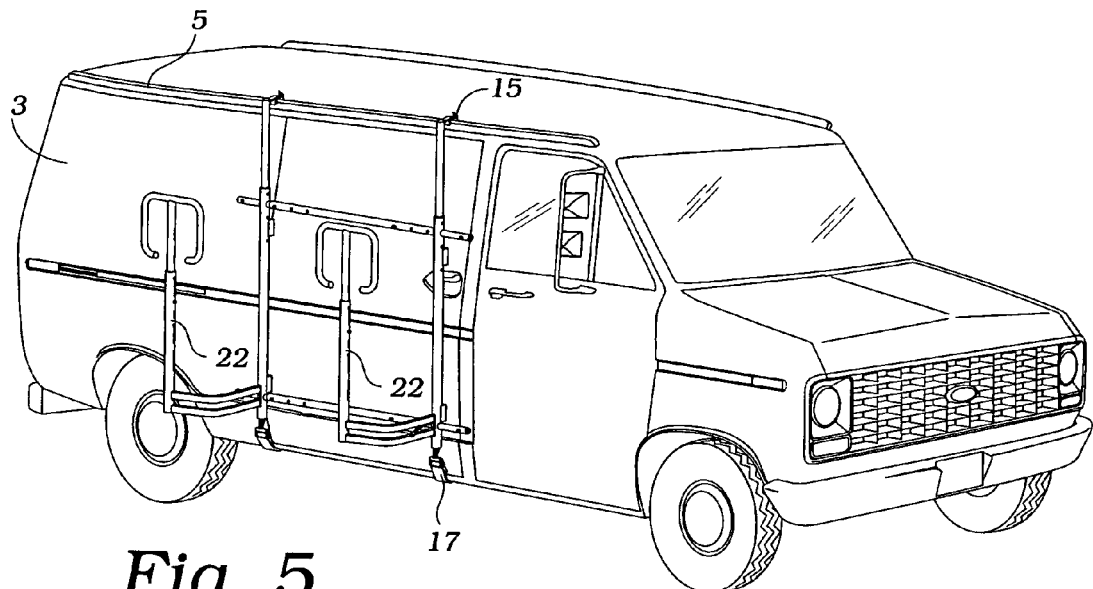
FIG. 5 is similar to FIG. 3 showing that the clamp is adapted for changing horizontal spacing between clamp bars.
Figure 6:
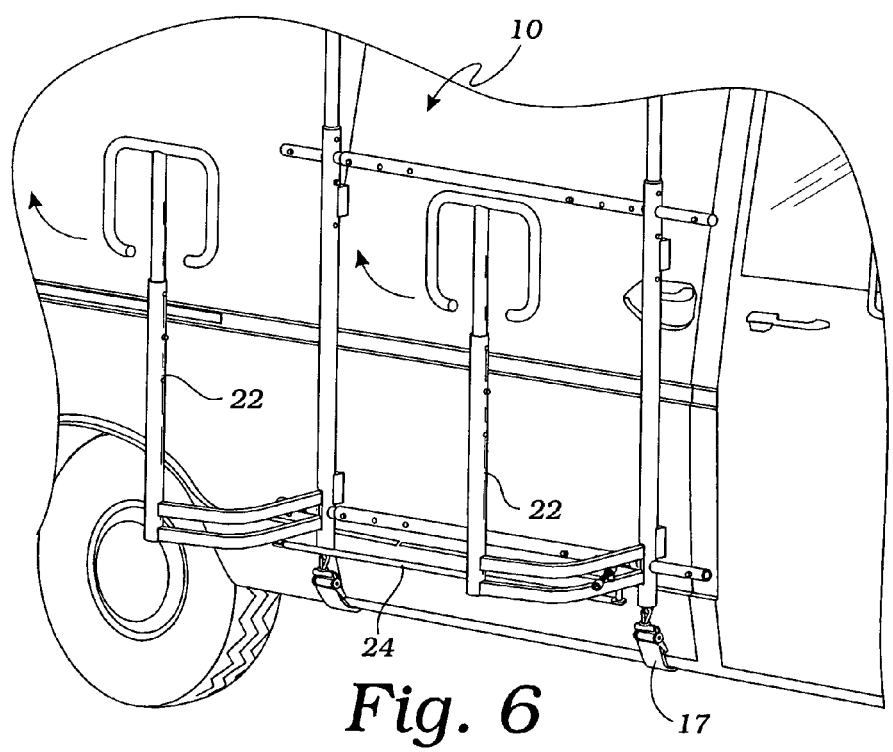
FIG. 6 is similar to FIG. 5 showing that plural clamping bars may be actuated by a single screw.

Preferably, the clamping means 20 comprises more than one, spaced-apart vertical clamping bars 22 mounted on horizontal pivot bars 23, and the clamping bars 22 may be each driven by an individual one of the driving means 30 as shown in FIGS. 1-5. Alternately, only one of the clamping bars 22 is driven while the other clamping bars 22 are pivotally engaged with the driven clamping bar 22 so that all of the bars 22 move in synchronization (FIG. 6). Such pivotal engagement is preferably a link bar 24. As best seen in FIG. 1, the pivot bars 23 are pivotally mounted at the lower ends of the vertical clamping bars 22 and are able to move over a range of horizontal angular motion as shown by arrows in FIGS. 4 and 6. The pivotal joint between pivot bar 23 and vertical clamping bars 22, i.e., the driving means 30 preferably includes jack screw 32, jack screw nut 36, jack nut pivot rod 34 and jack nut anchor pivot rod 38, as shown in FIG. 2. Arrow "A" depicts the motion achieved in this arrangement.

Preferably, the driving means 30 is at least one jack screw 32 as best seen in FIG. 2. The clamping means 20 is engaged with the at least one jack screw 32 for actuate motion of the clamping means 20 corresponding with axial rotational motion of the at least one jack screw 32. See arrow "B" in FIG. 2. FIG. 4 shows the use of an electric drill 9, for instance, for rotating jack screw 32. Manual rotation using any handy tool may alternately be used.

Preferably, the resting means 10 further comprises a means for restraining 12", wherein the restraining means is preferably positioned laterally to the resting means 10 and joined thereto, whereby the workpiece 7 is restrained from lateral movement along the exterior surface 3 of the vehicle 5. FIG. 7 shows the restraining means 12" positioned rearwardly on the vehicle 5 and extending in an attitude normal to the exterior surface 3. In this manner, panels being transported, should they move, by inertial forces of motion, such as during vehicle acceleration, toward the rear of the vehicle 5, will abut the restraining means 12 and thus be prevented from falling out of the grip of the clamping means 20. Clearly, such a restraining means 12" may also be positioned forward to prevent loss of cargo during braking of the vehicle 5.

As best seen in FIG. 1, the clamping bars 22 may have engaged at their upper terminal ends, an expanded portion 22' wherein the portion 22' provides an improvement in the clamping ability of the invention, especially for smaller panels or sheets.

The method of the present invention provides for carrying a workpiece adjacent the exterior surface of the vehicle. The method comprises mounting the stationary means for resting 10 on an exterior surface 3 of the vehicle 5 for resting the workpiece 7 against, engaging a movable means for clamping 20 adjacent to the resting means 10, engaging a means for driving 30 with the resting means 10 and the clamping means 20, rotating the driving means 30, to produce a scissors type motion of the clamping means 20, alternately toward the resting means 10 to clamp the workpiece 7 therebetween, and away from the resting means 10 so as to release the workpiece 7, whereby the workpiece 7 may be safely transported by the vehicle.

The method further comprises the step of engaging one of the driving means 30 with each one of the clamping bars 22 or engaging only one of the clamping bars 22 with the driving means 30 and engaging at least one other of the clamping bars 22 with the one of the clamping bars 22 such that the plural clamping bars 22 move with joint motion.

The method further comprises the step of engaging a means for restraining 12" with the resting means 10 in a position whereby the workpiece 7 is restrained from lateral movement along the exterior surface of the vehicle 5.

The method further comprises the step of engaging a means for space adjustment between the plural clamping bars.

While the invention has been described with reference to at least one preferred embodiment, it is to be clearly understood by those skilled in the art that the invention is not limited thereto. Rather, the scope of the invention is to be interpreted only in conjunction with the appended claims.

SEQUENCE LISTING

Not applicable

What is claimed is:

1. An apparatus for carrying a workpiece adjacent an exterior surface of a vehicle, the apparatus comprising: a pair of vertical rest bars mounted on an exterior surface of the vehicle for resting the workpiece against; a pair of horizontal pivot bars, each engaging a vertical clamping bar, each of the pivot bars further pivotally engaged with one of the vertical rest bars; a means for driving engaged with a horizontal rest bar and at least one pivot bar thereby enabling a scissors-type horizontal motion therebetween, whereby the vertical clamping bars are drawn toward or away from the vertical rest bars while maintaining mutually parallel juxtapositions between the clamping bars and the vertical rest bars so as to clamp the workpiece therebetween and to release the work piece, whereby the workpiece may be safely transported by the vehicle.

2. The apparatus of claim 1 wherein the driving means is engaged with each of the horizontal pivot bars.

3. The apparatus of claim 1 wherein the driving means is engaged with only one of the horizontal pivot bars, and one of the horizontal pivot bars is pivotally engaged with at least one further of the horizontal pivot bars so the clamping bars are enabled for moving synchronously.

4. The apparatus of claim 1 wherein the driving means comprises at least one jack screw, the horizontal pivot bars being engaged with the at least one jack screw for arcuate motion of the vertical clamping bars corresponding with rotational motion of the at least one jack screw.

5. The apparatus of claim 1 further comprising a means for restraining, the restraining means positioned lateral to the vertical rest bars and joined thereto, whereby the workpiece is restrained from lateral movement relative to the exterior surface of the vehicle.

6. The apparatus of claim 1 further comprising a means for space adjustment between the plural clamping bars.

* * * * *